United States Patent
Park et al.

(10) Patent No.: US 9,517,452 B2
(45) Date of Patent: Dec. 13, 2016

(54) METAL CARBIDE/CARBON COMPOSITE BODY HAVING POROUS STRUCTURE BY THREE-DIMENSIONAL CONNECTION OF CORE-SHELL UNIT PARTICLES, PREPARATION METHOD THEREOF, AND USE OF THE COMPOSITE BODY

(71) Applicant: Korea Institute of Energy Research, Daejeon (KR)

(72) Inventors: Ji Chan Park, Daejeon (KR); Heon Jung, Daejeon (KR); Ho Tae Lee, Daejeon (KR); Jung Il Yang, Daejeon (KR); Dong Hyun Chun, Daejeon (KR); Sung Jun Hong, Daejeon (KR); Seok Yong Hong, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 72 days.

(21) Appl. No.: 14/839,320

(22) Filed: Aug. 28, 2015

(65) Prior Publication Data
US 2016/0096167 A1    Apr. 7, 2016

Related U.S. Application Data

(63) Continuation-in-part of application No. PCT/KR2014/002827, filed on Apr. 2, 2014.

(30) Foreign Application Priority Data

Oct. 4, 2013    (KR) ........................ 10-2013-0118695

(51) Int. Cl.
*B01J 27/22*    (2006.01)
*B01J 37/03*    (2006.01)
(Continued)

(52) U.S. Cl.
CPC ............. *B01J 27/22* (2013.01); *B01J 35/0013* (2013.01); *B01J 37/031* (2013.01); *B01J 37/08* (2013.01);
(Continued)

(58) Field of Classification Search
None
See application file for complete search history.

(56) References Cited

U.S. PATENT DOCUMENTS

2014/0144422 A1    5/2014    Wie et al.

FOREIGN PATENT DOCUMENTS

| CN | 101417941 A | 4/2009 |
|----|-------------|--------|
| CN | 102344357 A | 2/2012 |

(Continued)

OTHER PUBLICATIONS

John et al, hot working and strengthening in metal carbide—graphite composites, 1986, journal of materials science, 21, pp. 2941-2958.*

(Continued)

*Primary Examiner* — Melvin C Mayes
*Assistant Examiner* — Stefanie Cohen
(74) *Attorney, Agent, or Firm* — Osha Liang, LLP

(57) ABSTRACT

The present invention relates to a metal carbide/carbon composite body having a porous structure, in which core-shell unit particles are three-dimensionally connected, a preparation method thereof, and the use of the composite body. More specifically, the present invention provides a metal carbide/carbon composite body, a preparation method thereof, and the use of the composite body, wherein the composite body is formed by high-temperature calcination of a metal oxalate hydrate body under a carbon monoxide-containing gas atmosphere, wherein the metal carbide/carbon composite body has a porous structure in which core- (Continued)

shell unit particles are three-dimensionally connected, wherein the core-shell unit particles comprise a metal carbide core formed by thermal decomposition of a metal oxalate hydrate; and a graphitic carbon shell, the product resulting from Boudouard reaction of carbon monoxide, formed on the metal carbide core.

19 Claims, 13 Drawing Sheets

(51) Int. Cl.
   B01J 37/08      (2006.01)
   B01J 37/10      (2006.01)
   B01J 35/00      (2006.01)
   C10G 2/00       (2006.01)

(52) U.S. Cl.
   CPC .............. B01J 37/082 (2013.01); B01J 37/10 (2013.01); C10G 2/332 (2013.01)

(56) References Cited

FOREIGN PATENT DOCUMENTS

| KR | 20040048093 A | 6/2004 |
| KR | 101087165 B1 | 11/2011 |
| KR | 20120135400 A | 12/2012 |

OTHER PUBLICATIONS

Andrei Y. Khodakov et al., Advances in the Development of Novel Cobalt Fisher-Tropsch Catalysts for Synthesis of Long-Chain Hydrocarbons nad Clean Fuels, Chem. Rev., 2007, vol. 107, Issue 5, pp. 1692-1744.

Hirsa M. Torres Calvis et al., Supported Iron Nanoparticles as Catalysts for Sustainable Production of Lower Olefins, Science, 2012, vol. 335 (#6070), pp. 835-838.

Emiel de Smit et al., The renaissance of iron-based Fisher-Tropsch synthesis: on the multifaceted catalyst deactivation behaviour, Chem,. Soc. Rev., 2008, 37, pp. 2758-2781.

Guobin Yu et al., FexOy@c Spheres as an Excellent Catalyst for Fisher-Tropsch Synthesis, J. Am. Chem. Soc., 2010, vol. 132, Issue 3, pp. 935-937.

Abstract of KR20050123435 (applicaiton No. KR20040048093).
Abstract of CN101417941.
Abstract of CN102344357.
Abstract of KR20110008591 (also published as KR101087165).

\* cited by examiner

METAL CARBIDE/CARBON COMPOSITE BODY HAVING POROUS STRUCTURE BY THREE-DIMENSIONAL CONNECTION OF CORE-SHELL UNIT PARTICLES, PREPARATION METHOD THEREOF, AND USE OF THE COMPOSITE BODY

TECHNICAL FIELD

The present invention relates to a metal carbide/carbon composite body having a porous structure, in which core-shell unit particles are three-dimensionally connected, a preparation method thereof, and a use of the composite body.

BACKGROUND ART

The Fischer-Tropsch (hereinafter, abbreviated as "FT") synthesis is a technique developed by German chemists Franz Fischer and Hans Tropsch in 1920, which produces synthetic fuel (i.e., hydrocarbons) from syngas (i.e., hydrogen and carbon monoxide) through the following reaction.

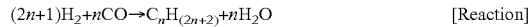

$(2n+1)H_2 + nCO \rightarrow C_nH_{(2n+2)} + nH_2O$      [Reaction]

Catalysts containing cobalt and iron are primarily used in such Fischer-Tropsch synthesis, and reaction conditions, such as reaction temperature, reaction pressure, gas composition, and the like, are determined based on the type of catalysts used.

The Fischer-Tropsch synthesis, according to reaction temperature, can be largely classified into low-temperature Fischer-Tropsch synthesis (LTFT), which is carried out at a temperature range between 200° C. to 250° C., and high-temperature Fischer-Tropsch synthesis (HTFT), which is carried out at a temperature range between 300° C. to 350° C. (Andrei Y. Khodakov et al, Chem. Rev., 2007, 107, 1672).

Traditionally, iron-based catalysts are used in the HTFT synthesis. Since the iron-based catalysts also show activity to the water-gas shift reaction, they can be used as various compositions in which a syngas ratio of hydrogen and carbon monoxide varies between 1 and 2, and further used in the presence of carbon dioxide, a gas impurity.

Further, the iron-based catalysts have been applied in commercial FT processes such as CTL (coal-to-liquid) as they are inexpensive and are strongly tolerant to sulfur-containing compounds. A representative example of the commercial processes includes the synthol process, which uses iron catalysts made of fused iron produced from Sasol Limited.

Recently, research demonstrating the successful application of a highly active catalyst having carbon bodies as a supporter for the iron catalysts in the high-temperature FT synthesis have been reported (Krijin P. de Jong. et al. Science, 2012, 335, 835). For example, in the case of materials composed of carbon, such as carbon nanotubes (CNT), carbon nanofibers (CNF), activated carbon, and the like, they are stable towards steam generated during the high-temperature FT synthesis and are advantageous in heat transmission, and the inside of the carbon supporter can provide much more favorable conditions for reduction and activation of particles. Therefore, they may have a positive impact on adsorption of CO, which is a reactant.

There have been many studies done on the FT synthesis for a long time, from almost 90 years in the past until now. Interestingly, because variations can occur during catalytic reactions where partial catalysts are stabilized, a controversy has flared up over the active species of catalysts involved in the actual FT synthesis, whether the active species of the catalysts is a metallic iron surface, or surface of iron carbide or bulk iron carbide, or iron oxide.

In this regard, most research findings report that iron carbide particles have a crucial impact on the reaction. A particular finding states that it is important to properly form a Hägg carbide ($\chi$-$Fe_5C_2$), which is the most active species in the FT synthesis among many iron carbides present as various phases including Hägg carbide ($\chi$-$Fe_5C_2$), pseudo-hexagonal iron carbide ($\acute{\epsilon}$-$Fe_{2.2}C$), hexagonal iron carbide ($\epsilon$-$Fe_3C$), Eckstrom-Adcock iron carbide ($Fe_7C_3$), cementite ($\theta$-$Fe_3C$), etc. (Weckhuysen, B. M. et al. Chem. Soc. Rev., 2008, 37, 2758).

However, it is well known in the art that it is very difficult to obtain $Fe_5C_2$ particles in a pure state, and accordingly, the reactivity thereof in the FT synthesis has not well been reported.

Meanwhile, the method for preparing iron catalysts used in the Fischer-Tropsch synthesis primarily includes a co-precipitation method or a wetness impregnation method, and the catalysts prepared by the methods above are widely used (Korean Patent No. 10-1087165 titled "The method for preparing of Fe based catalyst used in Fischer-Tropsch synthesis reaction and that of liquid hydrocarbon using Fe based catalyst").

Also, in the case of carbon-based iron composite catalysts that have recently been developed in addition to methods described above, they may be obtained by high temperature hydrothermal reaction or solvothermal reaction utilizing a surfactant (Zong et al. J. Am. Chem. Soc. 2010, 132, 935). However, such reactions still had difficulties in obtaining pure Hägg carbide ($\chi$-$Fe_5C_2$) phases, which show high activity in the FT synthesis, and also had a disadvantage in scaling up due to high cost and time concerns resulting from complicated procedures required during the synthesis.

DISCLOSURE

Technical Problem

An objective of the present invention is to provide a composite body having a porous structure in which metal carbide/carbon unit particles in a core-shell form are three-dimensionally connected, a preparation method thereof, and a use of the composite body, wherein the composite body is prepared by carrying out high-temperature calcination of a metal oxalate hydrate body having a certain shape under a carbon monoxide-containing gas atmosphere to convert the metal oxalate hydrate into a metal carbide, and at the same time to form a graphitic carbon shell via Boudouard reaction of carbon monoxide on the metal carbide.

Technical Solution

In a first aspect, the present invention provides a metal carbide/carbon composite body which is formed by high-temperature calcination of a metal oxalate hydrate body having a certain shape under a carbon monoxide-containing gas atmosphere, wherein the metal carbide/carbon composite body has a porous structure in which core-shell unit particles are three-dimensionally connected, wherein the core-shell unit particles comprise a metal carbide core formed by thermal decomposition of a metal oxalate hydrate; and a graphitic carbon shell, the product resulting from Boudouard reaction of carbon monoxide, formed on the metal carbide core.

In a second aspect, the present invention provides a method for preparing the metal carbide/carbon composite body having a porous structure according to the first aspect, wherein the method includes calcining a metal oxalate hydrate body having a certain shape at high temperature under a carbon monoxide-containing gas atmosphere (step 1).

In a third aspect, the present invention provides a method for preparing liquid or solid hydrocarbons from syngas via the Fischer-Tropsch synthesis, wherein the method includes applying the composite body of the first aspect as a catalyst in a Fischer-Tropsch synthesis reactor (step a); and carrying out the Fischer-Tropsch synthesis in the presence of the catalyst by introducing syngas into the reactor (step b). Herein, it is preferable that the composite body catalyst has a porous structure in which iron carbide/carbon unit particles in a core-shell form are connected together, wherein the core-shell unit particles include an iron carbide core of a Hägg carbide ($\chi$-Fe$_5$C$_2$) species and a graphitic carbon shell.

Hereinbelow, the present invention will be explained in detail.

In the present invention, it was observed that, when the metal oxalate hydrate body having a certain shape is subjected to high-temperature calcination under a carbon monoxide-containing gas atmosphere, the metal oxalate hydrate is thermally decomposed and converted into a metal carbide, and at the same time, a graphitic carbon shell is formed via the Boudouard reaction of carbon monoxide on the metal carbide, thereby forming metal carbide/carbon unit particles in a core-shell form, leading to the formation of a composite body having a porous structure, in which the core-shell unit particles are three-dimensionally connected. Specifically, it was observed that, during preparation of the metal oxalate hydrate body, a saccharide serving as a carbon source and a shape-controlling agent, a surfactant serving as another shape-controlling agent, and water are added to a metal hydrate salt to obtain a mixture, and then the metal oxalate hydrate body having a controlled shape may be obtained via hydrothermal reaction of the mixture, and thereafter the metal oxalate hydrate body having a controlled shape may be calcined at high temperature to produce the metal carbide/carbon unit particles in a core-shell form, wherein the metal carbide/carbon unit particles are three-dimensionally connected to form a porous structure, which subsequently leads to the formation of a composite body whose shape resembles the original external shape of the metal oxalate hydrate body. As such, when the composite body having a controlled external shape and a porous structure inside is used as a catalyst, reactants are rapidly diffused and the composite body becomes structurally stable under high-temperature environments, thereby showing superior reaction efficiency. The present invention is based on these observations.

The present inventors were able to readily obtain nanoparticles of a Hägg carbide ($\chi$-Fe$_5$C$_2$) species, which is an iron carbide phase that was difficult to synthesize conventionally, through synthesis of uniform iron oxalate hydrate bodies by a hydrothermal reaction of an aqueous solution of an iron hydrate salt containing a saccharide, and a subsequent high-temperature heat treatment of the iron oxalate hydrate bodies under a carbon monoxide atmosphere.

Specifically, the metal hydrate salt was mixed with a surfactant and a saccharide, and was decomposed. Then, the resultant was subjected to high-temperature hydrothermal reaction to be obtained as an iron oxalate hydrate body, and the iron oxalate hydrate body was activated via high-temperature calcination under a carbon monoxide atmosphere to obtain a composite body in which iron carbide/carbon core shell unit particles composed of a Hägg carbide ($\chi$-Fe$_5$C$_2$) phase, having high reactivity for the FT synthesis, are three-dimensionally connected. The thus-obtained iron carbide catalyst was confirmed to be a Hägg carbide ($\chi$-Fe$_5$C$_2$) species, which is well-known as highly active, via XRD analysis. Further, when the catalyst was applied in the high-temperature Fischer-Tropsch synthesis which took place at a high temperature of 300° C. or higher, it, as a superior catalyst, showed a decrease in methane selectivity and an increase in selectivity of liquid hydrocarbons having at least C$_{5+}$ among products.

1. Metal Carbide/Carbon Composite Body According to the Present Invention

As described above, the present invention provides a metal carbide/carbon composite body which is formed by high-temperature calcination of a metal oxalate hydrate body having a certain shape under a carbon monoxide-containing gas atmosphere, according to the present invention, wherein the metal carbide/carbon composite body has a porous structure in which core-shell unit particles are three-dimensionally connected, wherein the core-shell unit particles include a metal carbide core formed by thermal decomposition of a metal oxalate hydrate; and a graphitic carbon shell, the product resulting from Boudouard reaction of carbon monoxide, formed on the metal carbide core.

In an embodiment of the present invention, the metal oxalate hydrate body may be an iron oxalate hydrate body, and a metal carbide formed therefrom may be iron carbide. For example, when the iron oxalate hydrate is FeC$_2$O$_4$·2H$_2$O (s) and is subject to high-temperature calcination under a carbon monoxide-containing gas atmosphere, two reactions occur simultaneously as described below.

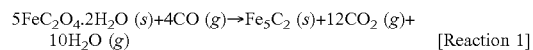

5FeC$_2$O$_4$·2H$_2$O (s)+4CO (g)→Fe$_5$C$_2$ (s)+12CO$_2$ (g)+ 10H$_2$O (g)     [Reaction 1]

2Co (g)⇌CO$_2$ (g)+C (s)     [Reaction 2]

Carbon dioxide (CO$_2$) formed through the Reaction 1 involves shrinking of particles and the formation of pores during metal carbide core formation, and carbon dioxide (g) and a graphitic carbon shell (s) are formed through the Reaction 2. Accordingly, the iron oxalate hydrate body can be successfully converted to a mesoporous core-shell Fe$_5$C$_2$/C composite body based on these two reactions.

Surprisingly, the shape of the metal carbide/carbon composite body having a porous structure according to the present invention may resemble the shape of the metal oxalate hydrate body, which is a precursor. When reaction conditions are appropriately controlled during the high-temperature calcination, a porous body, in which metal carbide core-carbon shell unit particles are three-dimensionally connected, may be obtained, while maintaining the shape of the metal oxalate hydrate body.

The metal oxalate hydrate is a compound in the form of a hydrate of salt that are formed by a metal cation and an oxalate dianion (C$_2$O$_4^{2-}$), and various compounds may be provided depending on the types and oxidation state of the metal cation. Herein, the types of metal can be single-type or multiple-type. For example, the metal oxalate hydrate may be iron oxalate hydrate, nickel oxalate hydrate, cobalt oxalate hydrate, iron-nickel oxalate hydrate, iron-cobalt oxalate hydrate, and the like.

The metal oxalate hydrate body may take the shape of an angled polyhedron such as a rectangular cuboid or a cube, but not the shape of a sphere or an oval.

The average diameter of the metal oxalate hydrate body is from 1 μm to 100 μm, for example, it may be from 5 μm to 50 μm, and specifically from 7 μm to 20 μm. The average diameter of the metal oxalate hydrate body may refer to the diameter of a sphere corresponding to the volume of the metal oxalate hydrate body.

The average diameter of the metal carbide/carbon composite body having a porous structure may be from 1 μm to 100 μm, for example, it may be from 5 μm to 50 μm, and specifically from 7 μm to 20 μm. The average diameter of the composite body may refer to the diameter of a sphere corresponding to the volume of the composite body.

The average diameter of the core-shell unit particles may be from 1 nm to 100 nm, for example, it may be from 5 nm to 50 nm, and specifically from 7 nm to 20 nm. The average diameter of the core-shell unit particles may refer to the diameter of a sphere corresponding to the volume of the core-shell unit particles.

The core-shell unit particle may serve as one microreactor. In the present invention, the metal carbide/carbon composite body having a porous structure has a porous structure in which core-shell unit particles, each of which can serve as one microreactor, are three-dimensionally connected and pores and/or porous channels having a size of nanometers, for example, 1 nm to 100 nm, are formed among the core-shell unit particles, thus leading to a rapid diffusion of reactants and superior reaction efficiency.

2. Method for Preparing Metal Carbide/Carbon Composite Body According to the Present Invention The method for preparing the metal carbide/carbon composite body having a porous structure includes calcining the metal oxalate hydrate body having a certain shape at high temperature under a carbon monoxide-containing gas atmosphere (step 1).

In the present invention, the preparation method above may include the following steps prior to step 1:

preparing a mixture including a metal hydrate salt, a surfactant, a saccharide, and water (step 1-1);

heating the mixture of step 1-1 to decompose the metal hydrate salt via a hydrothermal reaction, thereby forming a metal oxalate hydrate body having a controlled shape (step 1-2); and optionally cooling the product obtained in step 1-2 and washing the metal oxalate hydrate body (step 1-3).

That is, in the present invention, the metal oxalate hydrate body may be prepared by the preparation method including the steps 1-1 to 1-3 above. When prepared by the method above, the metal oxalate hydrate body having a controlled shape may be obtained. However, the method for preparing the metal oxalate hydrate body is not limited thereto, and can be prepared by a conventional method or commercially prepared products can be used.

Synthesis methods for a $Fe_5C_2/C$ composite body in a core-shell form, specifically, a composite body in a core-shell form containing active Hägg carbide ($Fe_5C_2$) nanoparticles, have not been reported until today. The composite body according to the present invention may include pure $Fe_5C_2$ nanoparticles, and thus it may exhibit superior catalytic performance in the FT synthesis. Specifically, in the present invention, three-dimensional $Fe_5C_2$@C core-shell microreactors having $Fe_5C_2$ nanoparticles of 10 nm diameter in graphitic carbon shells (1 nm to 2 nm) may be prepared by simply treating iron oxalate dehydrate cubes with heat under CO flow (FIG. 13).

As illustrated in FIG. 2, an embodiment of the present invention provides a method for preparing an iron carbide/carbon composite body having a porous structure including:

mixing an iron hydrate salt, a surfactant, and a saccharide with distilled water in a reactor (S100);

heating the mixture to decompose the iron hydrate salt via a hydrothermal reaction, thereby forming an iron oxalate hydrate body having a controlled shape (S200); cooling to room temperature, followed by dispersing and washing by introducing distilled water or ethanol (S300);

centrifuging the iron oxalate hydrate body using a centrifuge (S400);

calcining at high temperature powder collected by drying under a carbon monoxide gaseous atmosphere or a gas mixture atmosphere containing carbon monoxide and at least one of carbon dioxide, hydrogen, or nitrogen, to obtain an iron carbide/carbon composite body via decomposition and activation (S500);

placing the thus-obtained iron carbide/carbon composite body into an organic solvent to stabilize the body via passivation (S600); and collecting the iron carbide/carbon composite body using a magnet to eliminate the organic solvent, and vacuum drying to store the body (S700).

In the present invention, the shape of the metal oxalate hydrate body serving as a precursor for the metal carbide/carbon composite body may be controlled by regulating the type of saccharide, the type of surfactant, the amount of saccharide added, and/or the amount of surfactant added during preparation of the metal oxalate hydrate body. For example, when a monosaccharide is used as a saccharide, the shape of the metal oxalate hydrate body can be controlled into a cube, whereas when a disaccharide or polysaccharide is used as a saccharide, the shape of the metal oxalate hydrate body can be controlled to a rectangular cuboid. Also, even when a monosaccharide is used as a saccharide, the shape of the metal oxalate hydrate particles can be controlled into a rectangular cuboid if an excessive amount of surfactant is used.

With respect to step 1-1, the metal hydrate salt, as a metal precursor that forms the metal oxalate hydrate particles, can be appropriately selected and used depending on the type of desired metal oxalate hydrates. Specifically, the metal hydrate salt may include an iron hydrate salt, chromium hydrate salt, cobalt hydrate salt, nickel hydrate salt, palladium hydrate salt, copper hydrate salt, or a mixture thereof, but is not limited thereto.

The metal hydrate salt may be a metal compound that can indicate the acidity when dissolved in water. When the metal hydrate salt is acidic in an aqueous phase, it can act as a catalyst to increase the rate of decomposition during a reaction with the saccharide.

In a preferred embodiment, the metal hydrate salt may be at least one selected from iron(III) chloride tetrahydrate, iron(II) chloride tetrahydrate, iron(III) chloride hexahydrate, iron(II) chloride tetrahydrate, iron(III) nitrate nonahydrate, iron(III) sulfate hydrate, iron(II) perchlorate hydrate, and iron(II) sulfate hydrate.

The saccharide can serve as a carbon source and a shape-controlling agent for forming the metal oxalate hydrate particles.

In a preferred embodiment, the saccharide may be at least one selected from a monosaccharide, a disaccharide, and a polysaccharide. More preferably, monosaccharide and disaccharide compounds may be used to have uniformity of the particles.

The saccharides can be selected and used depending on the desired shape of the metal oxalate hydrate particles. Specifically, as described above, a monosaccharide may be used in order to obtain the metal oxalate hydrate particles in the shape of a cube. Also, a disaccharide and/or a polysaccharide may be used in order to obtain the metal oxalate hydrate particles in the shape of a rectangular cuboid, and for the formation of more uniform and large particles, the disaccharide is used.

The non-limiting examples of the monosaccharide include glucose, fructose, galactose, or a mixture thereof.

The non-limiting examples of the disaccharide include sucrose, lactose, maltose, trehalose, melibiose, cellobiose, or a mixture thereof.

The non-limiting examples of the polysaccharide include raffinose, stachyose, starch, dextrin, glycogen, cellulose, or a mixture thereof.

The surfactant may serve as a shape-controlling agent for inducing the formation of the metal oxalate hydrate particles and regulating the shape thereof. If the surfactant was not used, it would be difficult to control the formation of particles having desired shape and uniformity.

In the present invention, the surfactant can be polyvinylpyrrolidone (PVP), which is a polymer surfactant.

As a polymer surfactant that can affect the formation of the shape of the iron oxalate hydrate body, polyvinylpyrrolidone (PVP) may be used, and it may have an average molecular weight of 10,000 to 36,000 considering the viscosity and easy separation after the reaction. The shape of the particles may vary depending on the amount of PVP used.

In the present invention, the molar ratio of the surfactant may be from 0.5 to 40 relative to 1 mole of the metal hydrate salt.

In the present invention, the parts by weight of the saccharide may be from 0.5 to 10 relative to 1 part by weight of the metal hydrate salt.

In a preferred embodiment, the shape of the iron oxalate hydrate particles is controlled depending on the types and the amount of saccharide and surfactant that are mixed with the iron hydrate salt, and they are added such that the molar ratio of PVP, a surfactant, lies between 0.5 and 40 relative to 1 mole of the iron hydrate salt, and in the case of the saccharide, the parts by weight thereof lie between 0.5 and 10 relative to 1 part by weight of the iron hydrate salt. If the molar ratio of PVP is below 0.5 relative to 1 mole of the iron hydrate salt, the shape of a rectangular cuboid may not be properly formed, whereas if the molar ratio exceeds 40, a particle separation may be difficult after the reaction due to excess PVP, and there may be no particular improvement in the shape formation. Also, if the amount of saccharide is below 0.5 parts by weight relative to 1 part by weight of the iron hydrate salt, the iron oxalate may not be properly formed, whereas if the amount exceeds 10 parts by weight relative to 1 part by weight of the iron hydrate, the excessive amount of saccharide does not undergo the reaction, and gets discarded after the reaction, and thus, it is useless.

In step 1-2 for decomposing and aging the metal hydrate salt via a hydrothermal reaction, it is preferable to reflux at high temperature.

The hydrothermal reaction may be carried out by heating the solution of step 1-1 above to 80° C. to 150° C., for example, heating the solution to 100° C. after stirring under an air atmosphere, followed by reacting the solution for 30 minutes to 48 hours. An aqueous solution containing the saccharide, the metal hydrate salt, and the surfactant genuinely starts undergoing reaction when water in the solution begins to change into gas upon boiling, and the reaction time is preferably from 30 minutes to 48 hours considering sufficient decomposition of the metal hydrate salt (metal source) and the saccharide (carbon source), and the transformation into a metal oxalate.

After going through step 1-2, deep yellowish colloidal solution is formed in the case of the iron oxalate.

When the metal oxalate hydrate body is formed through the sufficient aging process in step 1-2, the product thereof is cooled, and then the step 1-3 is carried out by introducing water and/or a $C_{1-4}$ alcohol, which can easily disperse the metal oxalate body, to disperse the same, followed by centrifugation. Any contaminants can be eliminated through step 1-3.

For example, ethanol can be used as the $C_{1-4}$ alcohol.

Re-dispersion and centrifugation may be further carried by re-introducing water and/or the $C_{1-4}$ alcohol after step 1-3.

Also, after the above process in which any contaminants may be eliminated through washing, drying under vacuum or an air atmosphere may be carried to obtain the metal oxalate hydrate body in the form of a powder.

Subsequently, the metal oxalate hydrate body may be subjected to high-temperature calcination according to step 1 to prepare a composite body having a porous structure formed by three-dimensional connection of the metal carbide/carbon unit particles in a core-shell form. Herein, a high-temperature calcinator may be tubular.

The high-temperature calcination of the metal oxalate hydrate body may be carried out at a temperature of 300° C. to 450° C., and preferably from 350° C. to 400° C. The temperature may be applied from 300° C. or higher, which is the temperature at which the metal oxalate hydrate is completely decomposed, and when the temperature of 500° C. or higher is applied during heat treatment, this may result in severe aggregation and sintering between the particles. In the case of the iron oxalate hydrate body, if the calcination temperature is too high, $Fe_3C$, a less active iron carbide phase, is formed.

A pure carbon monoxide atmosphere is appropriate for the gaseous atmosphere during the high-temperature calcination to easily convert the metal oxalate body to the metal carbide, but the formation of metal carbide is still possible under a gas mixture containing carbon monoxide and at least one of carbon dioxide, hydrogen, and nitrogen.

The high-temperature calcination may be carried out for 1 hour to 48 hours considering sufficient decomposition of the metal oxalate hydrate body and crystallization of the metal carbide particles.

In an embodiment, in a case in which the metal oxalate hydrate body is an iron oxalate hydrate body and the metal carbide formed therefrom is iron carbide, the preparation method thereof may further include, after step 1 above: placing the iron carbide/carbon composite body into an organic solvent to stabilize the composite body via passivation; and collecting the iron carbide/carbon composite body using a magnet and vacuum drying to store it.

Because the iron carbide/carbon composite body prepared from the iron oxalate hydrate body by the preparation method according to the present invention includes the iron carbide of a Hägg carbide ($\chi$-$Fe_5C_2$) species, it can be useful as a catalyst in the Fischer-Tropsch synthesis specifically carried out under high temperatures.

The passivation process for stabilizing the catalyst activated under the high-temperature activated-gas atmosphere is an important step for further reaction of the reduced catalyst, playing a role in preventing reaction of the catalyst with oxygen.

Herein, various solvents including ethanol, mineral oil, etc., can be used as organic solvents, but water, which can facilitate the oxidation and variation of the catalyst, cannot be used. The passivation is carried out through placing the catalyst directly into the organic solvent to avoid exposure to oxygen under nitrogen or other inert gas atmospheres. Preferably, ethanol that is easily volatilized can be used as the organic solvent for further analyses or application to a fixed bed reactor.

In the case of the iron carbide/carbon composite body placed in the organic solvent, the composite body itself is magnetic, and thus can be easily separated from the solvent using a magnet, and preferably, the composite body can be used immediately after separation and re-drying via a vacuum drying process or can be stored with vacuum packing or nitrogen packing.

3. Use of Metal Carbide/Carbon Composite Body According to the Present Invention The metal carbide/carbon composite body according to the present invention may be used as catalysts, adsorbents, electrode materials, or sensor materials.

As the iron carbide/carbon composite body according to the present invention can be used as a catalyst in the Fischer-Tropsch synthesis, it is introduced into a Fischer-Tropsch synthesis reactor, and then preferably activated, and subsequently, if syngas is introduced thereto, liquid or solid hydrocarbons may be prepared via the Fischer-Tropsch synthesis.

Specifically, the iron carbide/carbon composite body obtained from the iron oxalate hydrate particles includes the iron carbide of a Hägg carbide ($\chi$-$Fe_5C_2$) species, thereby providing a catalyst for the Fischer-Tropsch synthesis having superior catalytic activity. The iron carbide/carbon composite body prepared according to the present invention may include the Hägg carbide species occupying 70% to 100% of weight relative to the overall weight of the iron carbide species.

If the iron carbide/carbon composite body including the Hägg carbide ($\chi$-$Fe_5C_2$) phase according to the present invention is used as a catalyst in the Fischer-Tropsch synthesis, liquid or solid hydrocarbons can be efficiently prepared based on high CO conversion rate and selectivity. When a temperature of 300° C. or higher is applied during high-temperature FT synthesis, it shows significantly high CO conversion rate, low selectivity of methane, and high selectivity of liquid hydrocarbons having $C_{5+}$.

The method for preparing liquid or solid hydrocarbons from syngas via the Fischer-Tropsch synthesis according to the present invention includes:

applying the composite body of the first aspect as a catalyst in a Fischer-Tropsch synthesis reactor (step a); and carrying out the Fischer-Tropsch synthesis in the presence of the catalyst by introducing syngas into the reactor (step b).

Herein, the composite body catalyst may have a porous structure, in which iron carbide/carbon unit particles including an iron carbide core of a Hägg carbide ($\chi$-$Fe_5C_2$) species and a graphitic carbon shell are connected together.

The method for preparing liquid or solid hydrocarbons from syngas according to the present invention may further include reducing the catalyst to activate the same between step a and step b (step a-1).

The Fischer-Tropsch synthesis reactor may be a tubular fixed bed reactor.

The syngas used in the present invention may be a mixture of carbon monoxide and hydrogen, or of carbon monoxide and hydrogen mixed with at least one selected from inert gases, methane and carbon dioxide as impurities. Preferably, a mixture having a ratio between carbon monoxide and hydrogen of 1:1 to 1:2, and more preferably a mixture having a ratio therebetween of 1:1, may be used to increase product yield, however, impurities such as carbon dioxide, methane or other inert gases may further be added. The ratio between carbon monoxide and hydrogen may refer to a volume ratio. Further, the ratio of syngas in the Fischer-Tropsch synthesis throughout the invention may refer to a volume ratio.

Also, the syngas may be introduced with a space velocity range of 6 NL/$g_{cat}$/hr to 42 NL/$g_{cat}$/hr. Even if the space velocity is below the range, the reaction may still be carried out, but the productivity of hydrocarbons per unit hour may decrease. In contrast, if syngas is introduced with a higher space velocity than the range, CO conversion rate may decrease.

The reaction temperature for step b may be from 250° C. to 350° C., however in order to increase the CO conversion rate and the yield of liquid hydrocarbons, the reaction temperature may preferably be from 300° C. to 350° C.

The reaction pressure for step b may preferably be from 10 bar to 30 bar in order to increase the CO conversion rate and the yield of liquid hydrocarbons, and more preferably, it may be 15 bar.

BEST MODE

Hereinafter, the present invention will be described in more detail with reference to the following examples. However, the following examples are provided for illustrative purposes only, and the scope of the present invention should not be limited thereto in any manner.

Example 1

Synthesis of Cube-Type Iron Oxalate Body Via Hydrothermal Reaction 10 g of $Fe(NO_3)_3.9H_2O$ salt (Aldrich, 98+%, fw=404 g/mol, m. p.=47.2° C.), 8.35 g (three equivalents) of polyvinylpyrrolidone (PVP, average Mw~55,000), and 9 g of glucose, a monosaccharide, were placed into a flask containing 50 mL of distilled water, and the resulting mixture was stirred under an air atmosphere and heated to 100° C. After heating, the resulting mixture underwent hydrothermal reaction at 100° C. for 1 hour, and the mixture was cooled to room temperature to terminate the reaction.

Figure 1:
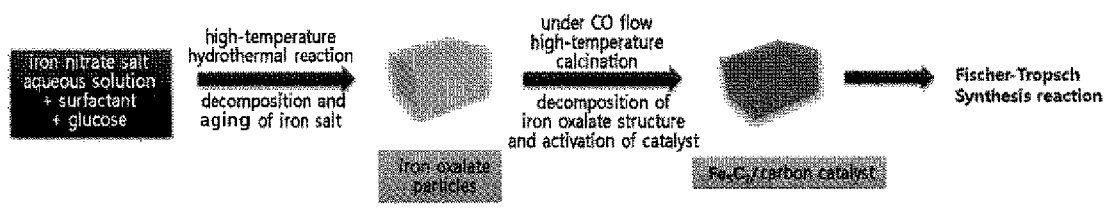
FIG. 1 is an illustration showing the change in particle during preparation of the carbon-based composite catalyst including highly active $Fe_5C_2$ nanoparticles for the Fischer-Tropsch catalytic reaction according to an embodiment of the present invention.
Figure 2:
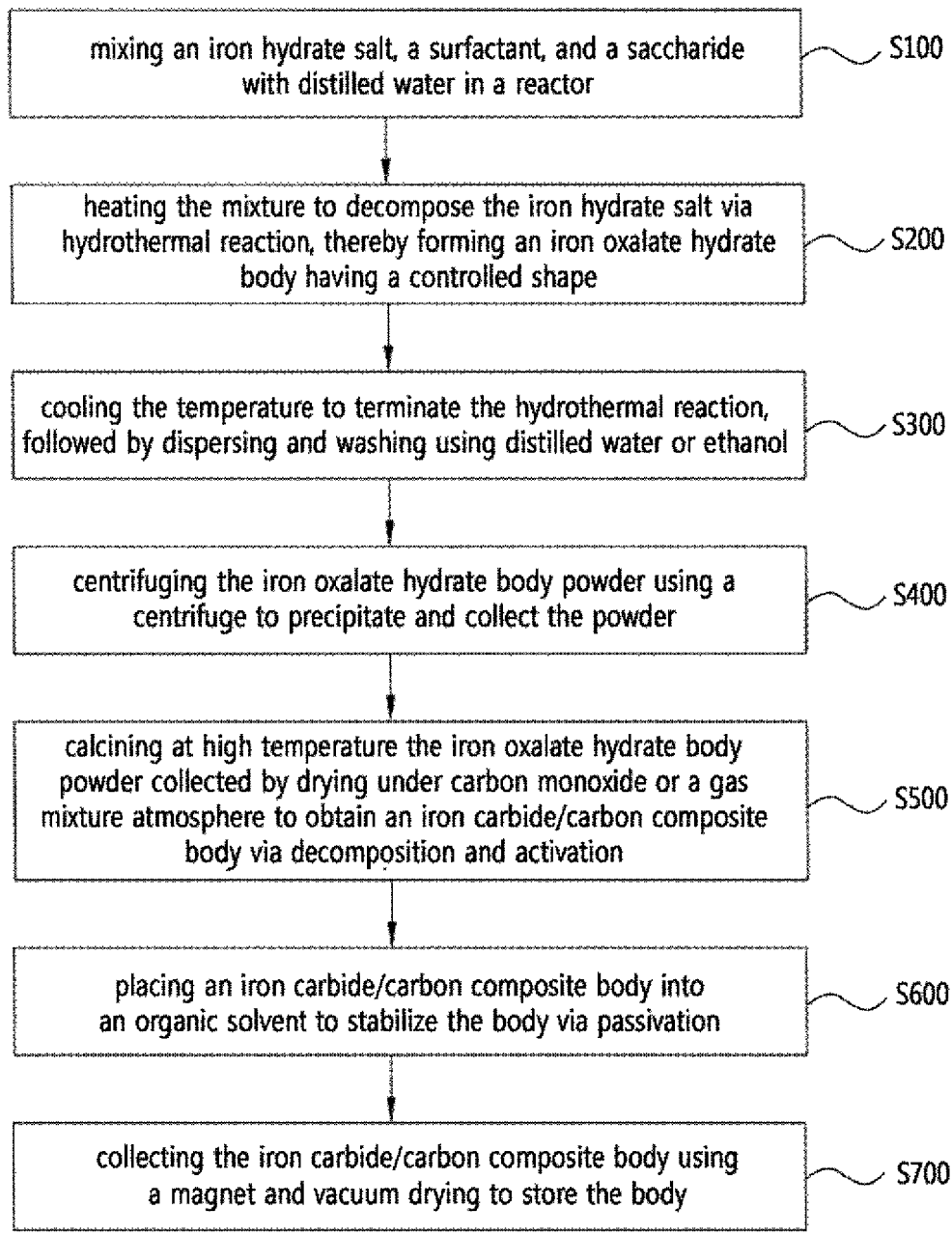
FIG. 2 shows a flow chart of the preparation of the carbon-based composite body including highly active $Fe_5C_2$ nanoparticles according to an embodiment of the present invention.
Figure 3:
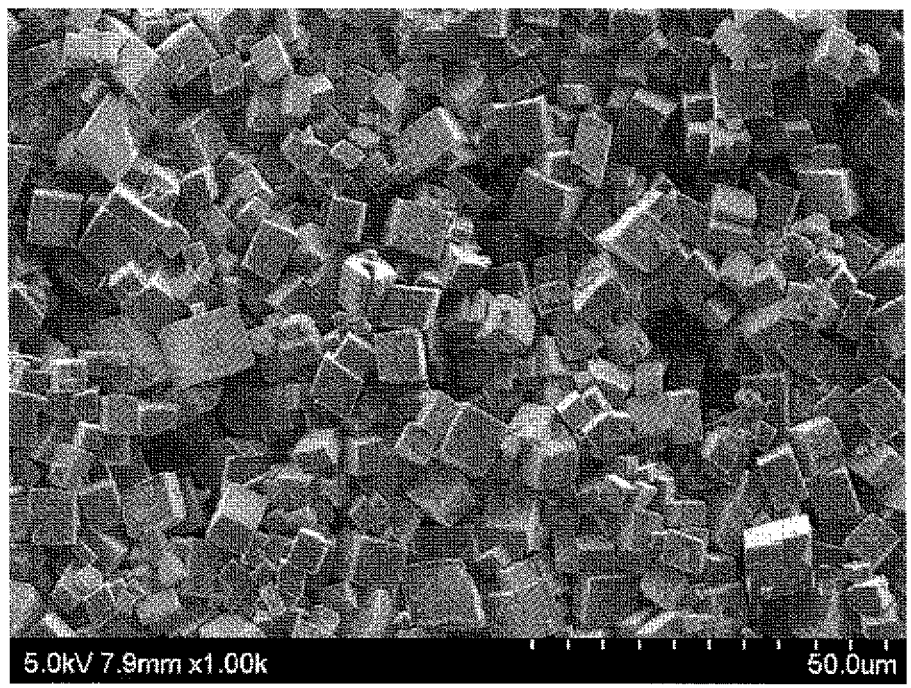
FIG. 3 shows a SEM image of cube-type iron oxalate particles obtained via a hydrothermal reaction according to Example 1.

A colloidal solution, which was cooled at room temperature, was washed once by pouring distilled water thereinto, and the resulting mixture was subjected to centrifugation. Then, the distilled water was discarded, and the remaining mixture was washed again by pouring ethanol thereinto, followed by centrifugation. Herein, the mixture was precipitated by centrifugation at 10000 rpm for 30 minutes. The SEM (Scanning Electron Microscope) image of the thus-obtained iron oxalate body is shown in FIG. 3. As a result, the iron oxalate body was found to be in the shape of a cube, and the size thereof was about 10 μm, as shown in the SEM image.

Example 2

Synthesis of Cube-Type Iron Oxalate Body Via Hydrothermal Reaction and Conversion Thereof into Highly Active Iron Carbide/Carbon Catalyst The iron oxalate hydrate body was prepared by the same method as in Example 1, except that the hydrothermal reaction was carried out at 100° C. for 26 hours.

The iron oxalate powder dried after precipitation was introduced into a tubular calcinator, and was subjected to heat treatment at 300° C. and 400° C., respectively, for 4 hours under a carbon monoxide gaseous atmosphere (atmospheric pressure, velocity at 100 mL/min to 200 mL/min) to obtain a $Fe_5C_2$/carbon nanocomposite catalyst.

Figure 4:
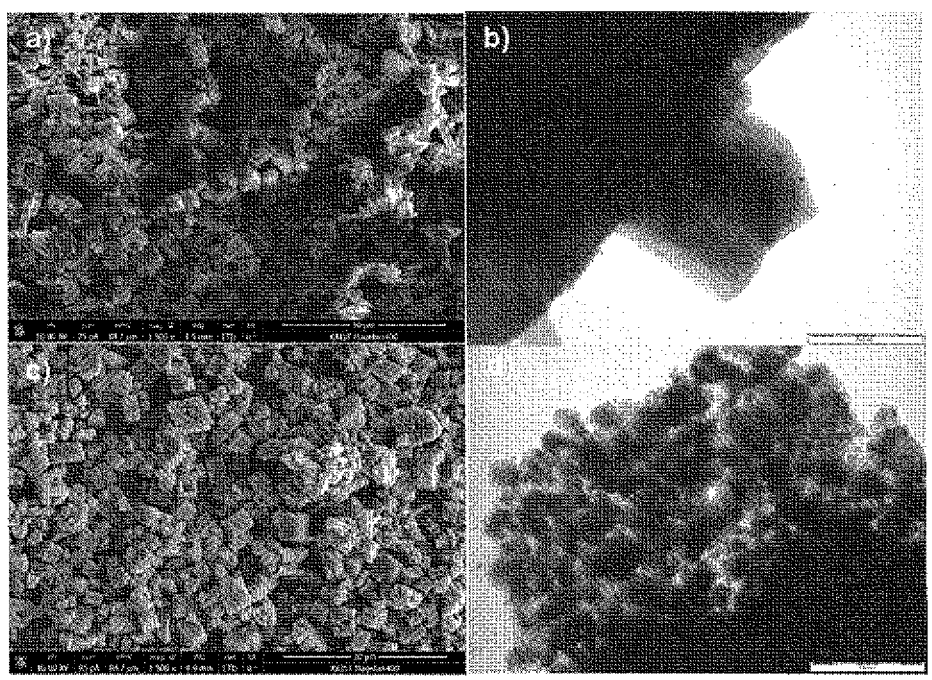
FIG. 4 shows SEM (a, c) and TEM (b, d) images of a $Fe_5C_2$/carbon composite body which is activated via high-temperature heat treatment of the iron oxalate particles under a carbon monoxide atmosphere according to Example 2 (a, b: heat treatment at 300° C., and c, d: heat treatment at 400° C.).

As shown in FIGS. 4a and 4b, when the heat treatment was carried out at 300° C., it was observed that the cube-type structures were not properly maintained and some branched structures were formed (FIG. 4a), and the iron oxalate was not sufficiently reduced to iron carbide particles (FIG. 4b).

In contrast, when the heat treatment was carried out at 400° C., the original cube-type structures were fairly maintained as shown in FIG. 4c, and small iron carbide particles of several tens of nanometers in size were confined inside of the micrometer sized particles thereof, as shown in FIG. 4d.

Example 3

Synthesis of Highly Active Iron Carbide Catalyst Via Hydrothermal Reaction

The iron oxalate hydrate body was prepared by the same method as in Example 1, except that 5 g of $Fe(NO_3)_3.9H_2O$ salt, 4.18 g (three equivalent) of PVP, 4.5 g of glucose, and 25 mL of distilled water were used, and the hydrothermal reaction was carried out at 100° C. for 26 hours.

As a result, it was confirmed that variations on the synthesis time and the synthesis scale generally did not have a significant impact on the shape of the cubic particles, compared to the experimental conditions of Examples 1 and 2. Further, the thus-obtained iron oxalate body underwent high-temperature calcination again at 350° C. for 4 hours under a carbon monoxide atmosphere and was converted to a $Fe_5C_2$/carbon nanocomposite catalyst.

The $Fe_5C_2$/carbon nanocomposite catalyst powder obtained is readily oxidized upon exposure to air, and thus, immediately after activation to iron carbide, an atmosphere was created to prevent exposure to air using inert gases such as nitrogen or helium, and passivation was carried out through wetting the nanocomposite catalyst powder in ethanol under the atmosphere created. Then, the nanocomposite catalyst powder wetted with ethanol was dried in a vacuum oven to be applied in the catalytic reaction and analysis.

Figure 5:
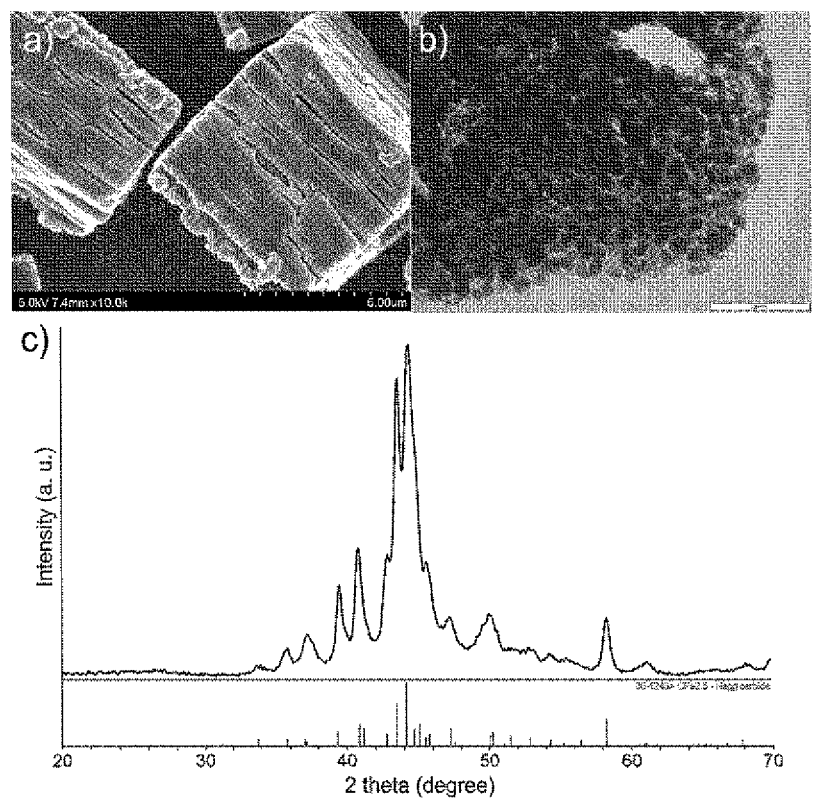
FIG. 5 shows a SEM image (a), TEM image (b), and XRD spectrum (c) of the $Fe_5C_2$/carbon composite body obtained after activation at 350° C. under a carbon monoxide atmosphere according to Example 3.

The iron content of the thus-obtained $Fe_5C_2$/carbon nanocomposite catalyst powder was analyzed via ICP-AES (inductively coupled plasma atomic emission spectroscopy) analysis, and as a result, it showed a significantly high iron content of 81.8 wt %. As shown in FIGS. 5a and 5b, the basic cubic structures were maintained and small particles were formed inside of the cubic structures. Further, as shown in FIG. 5c, it was confirmed that the crystal phase of the particles was found to be a Hägg carbide ($\chi$-$Fe_5C_2$, JCPDS No. 36-1248) species, which is known as highly active among iron carbides, via XRD (X-ray Diffraction) analysis.

Example 4

High-Temperature FT Synthesis Using $Fe_5C_2$/Carbon Body Catalyst Converted from Iron Oxalate Body The high-temperature FT synthesis was carried out using an automated system in a fixed bed reactor introduced with the $Fe_5C_2$/carbon catalyst obtained in Example 3.

60 mg of the catalyst was loaded onto a reactor immediately after drying, for the use thereof, wherein the reactor has an inner diameter of 5 mm. 4.2 g of glass bead was further added to prevent the formation of a hot spot in the catalyst due to severe exothermic reaction.

After loading of the catalyst, it was further activated at atmospheric pressure under a carbon monoxide atmosphere (40 mL/min) to recover some parts of the oxidized catalyst surfaces as pure iron carbide.

Then, syngas in which the ratio between hydrogen to carbon monoxide was maintained as 1:1 was introduced into the reactor under the conditions with a reaction pressure of 15 atm and a gas hourly space velocity (GHSV) of 40 NL/G$_{(cat)}$-h, and the high-temperature Fischer-Tropsch synthesis was carried out at 320° C.

Figure 6:
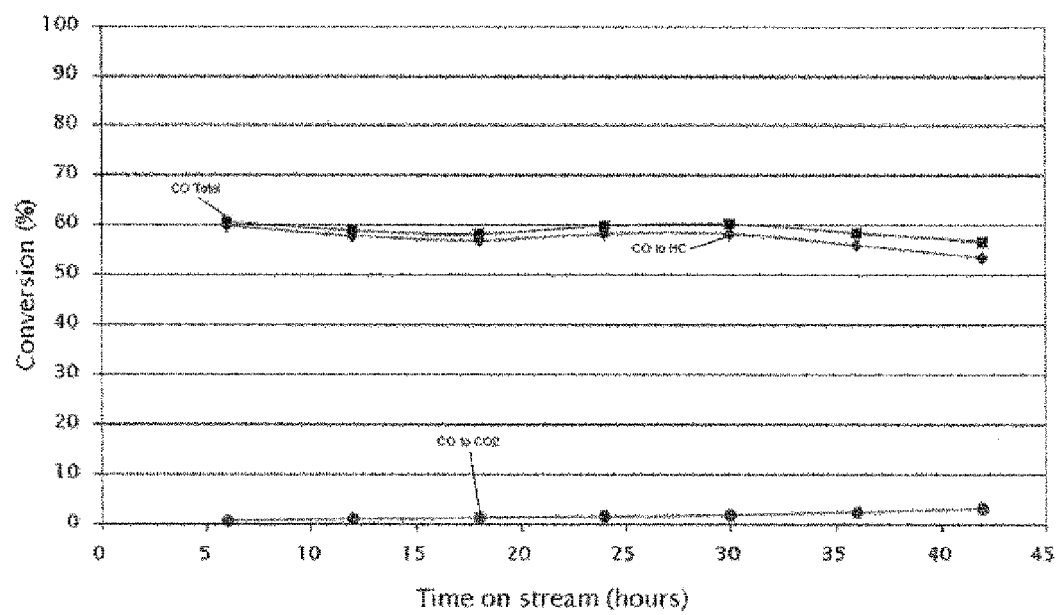
FIG. 6 is a graph showing CO conversion rate of $Fe_5C_2$/carbon catalyst relative to time according to Example 4.
Figure 7:
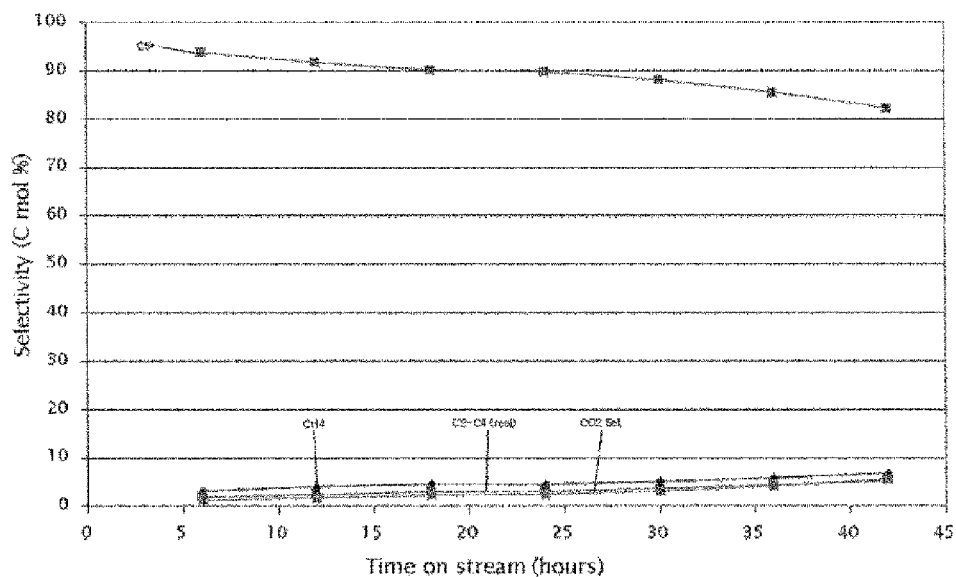
FIG. 7 is a graph showing hydrocarbon product selectivity of $Fe_5C_2$/carbon catalyst relative to time according to Example 4.
Figure 8:
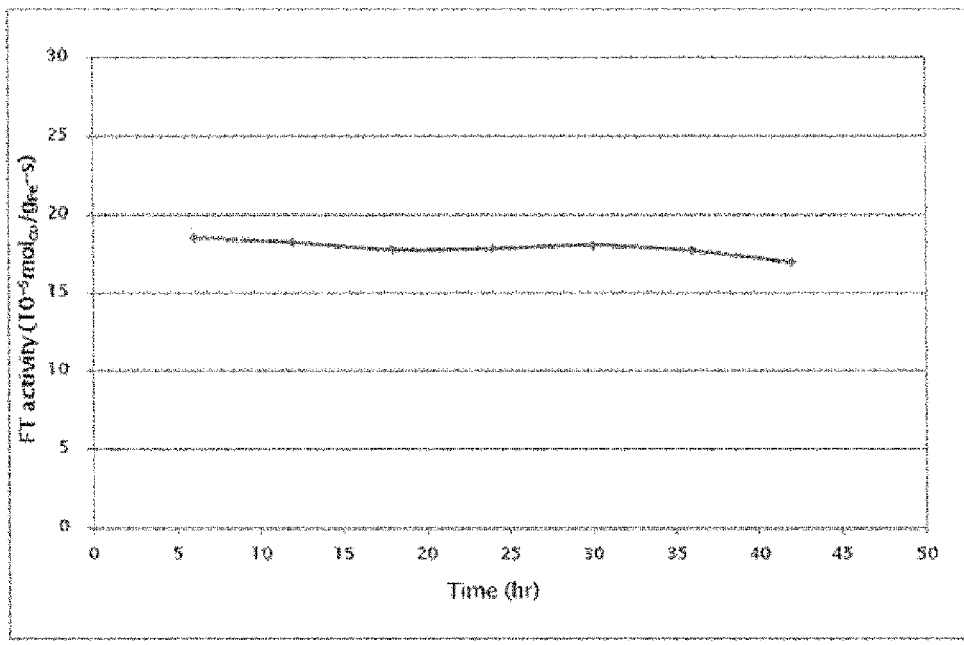
FIG. 8 is a graph showing FT activity of hydrocarbon production of $Fe_5C_2$/carbon catalyst relative to time according to Example 4.

The results of 42 hours of reaction are illustrated in FIGS. 6 to 8. As a result, despite the fact that only a small amount of catalyst was used relative to reactant flow rate, the CO conversion rate was as significantly high as 60%, as shown in FIG. 6. Further, in the product selectivity graph of FIG. 7, the selectivity for liquid hydrocarbons (C$_{5+}$) exceeded 80%, indicating that the catalyst exhibits significantly superior characteristics.

Also, FTY (iron time yield) that indicates the degree of conversion of hydrocarbons according to units of iron in grams per hour was significantly high, as shown in FIG. 8.

Comparative Example 1

Fischer-Tropsch Synthesis Using Iron Carbide/Activated Carbon Catalyst

In order to provide a comparative catalyst, the iron carbide particles were loaded onto commercial activated carbon powder through melt-infiltration of iron salts, and then were activated under a high-temperature carbon monoxide atmosphere to obtain a catalyst. Subsequently, the high-temperature FT synthesis was carried out using the catalyst obtained above.

Figure 9:
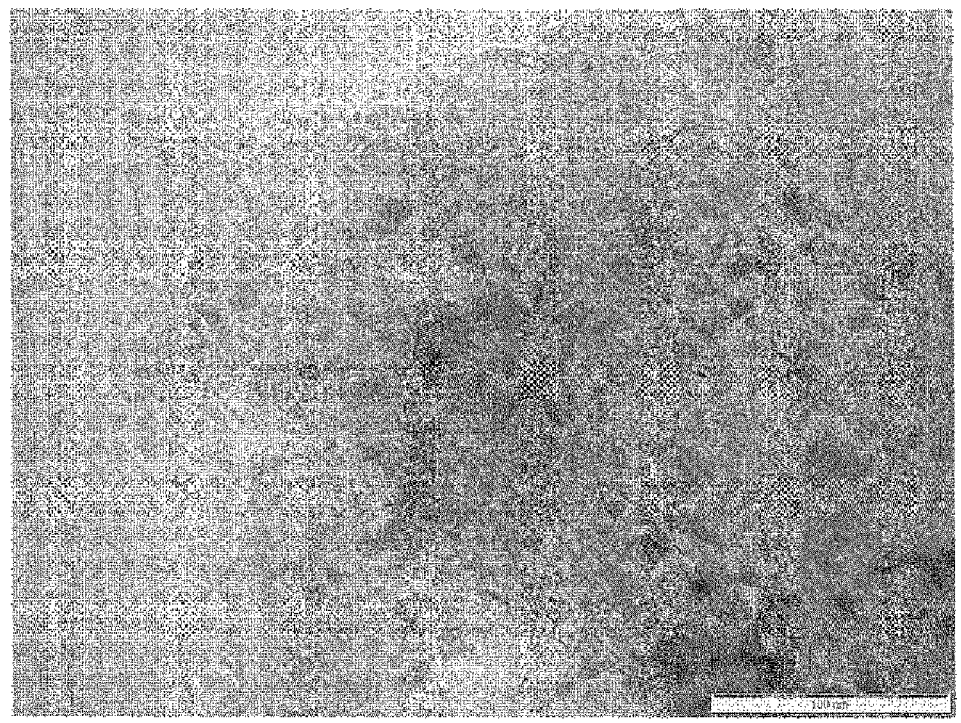
FIG. 9 shows a TEM image of an iron carbide/activated carbon catalyst according to Comparative Example 1.

The size of iron carbide particles loaded with 20 wt % of iron in the commercial activated carbon was between 10 nm to 20 nm (FIG. 9).

100 mg of iron carbide/activated carbon catalyst was dried and immediately loaded onto a reactor having an inner diameter of 5 mm for the use thereof. Also, 4.2 g of glass bead was further added thereto.

The catalyst was loaded inside of the reactor, and a further activation process was carried out under a CO atmosphere with a velocity of 40 mL/min at atmospheric pressure for 4 hours to activate some parts of the catalyst that had been oxidized as iron carbide.

Figure 10:
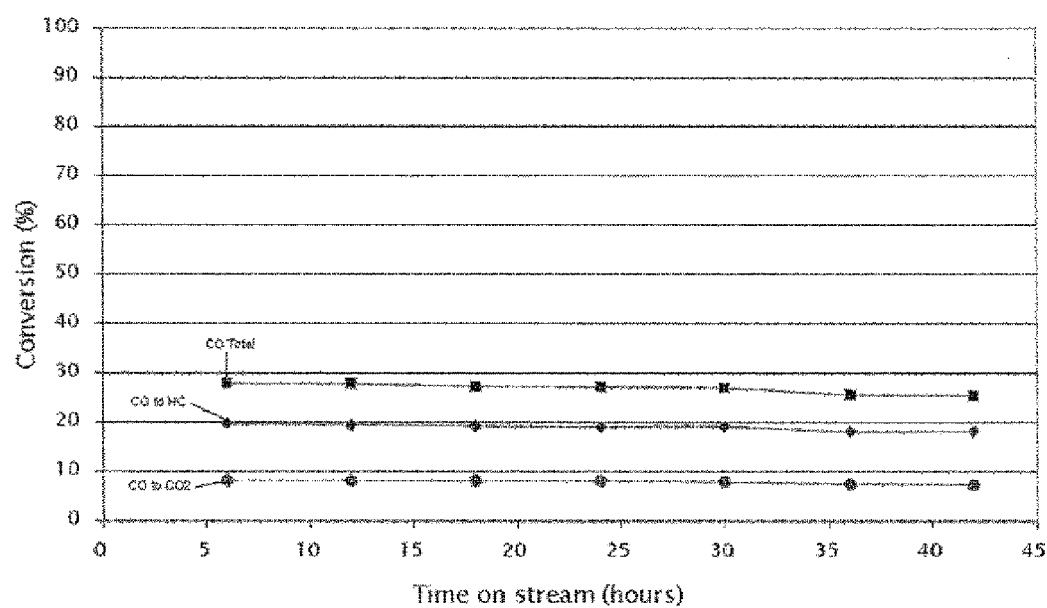
FIG. 10 is a graph showing carbon monoxide conversion rate of an iron carbide/activated carbon catalyst relative to time according to Comparative Example 1.

Then, syngas in which the ratio between hydrogen to carbon monoxide was maintained as 1:1 was introduced into the reactor under the conditions with a reaction pressure of 15 atm and a gas hourly space velocity (GHSV) of 24 NL/G$_{(cat)}$-h, and the high-temperature Fischer-Tropsch synthesis was carried out at 330° C. The results of 42 hours of reaction are illustrated in FIGS. 10 to 12.

Figure 11:
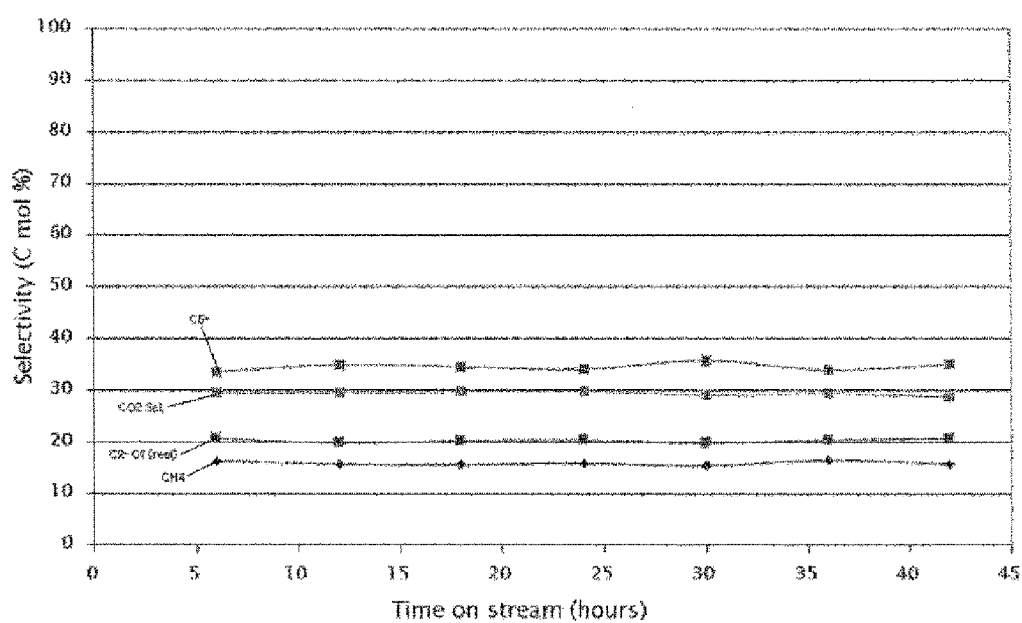
FIG. 11 is a graph showing hydrocarbon product selectivity of an iron carbide/activated carbon catalyst relative to time according to Comparative Example 1.
Figure 12:
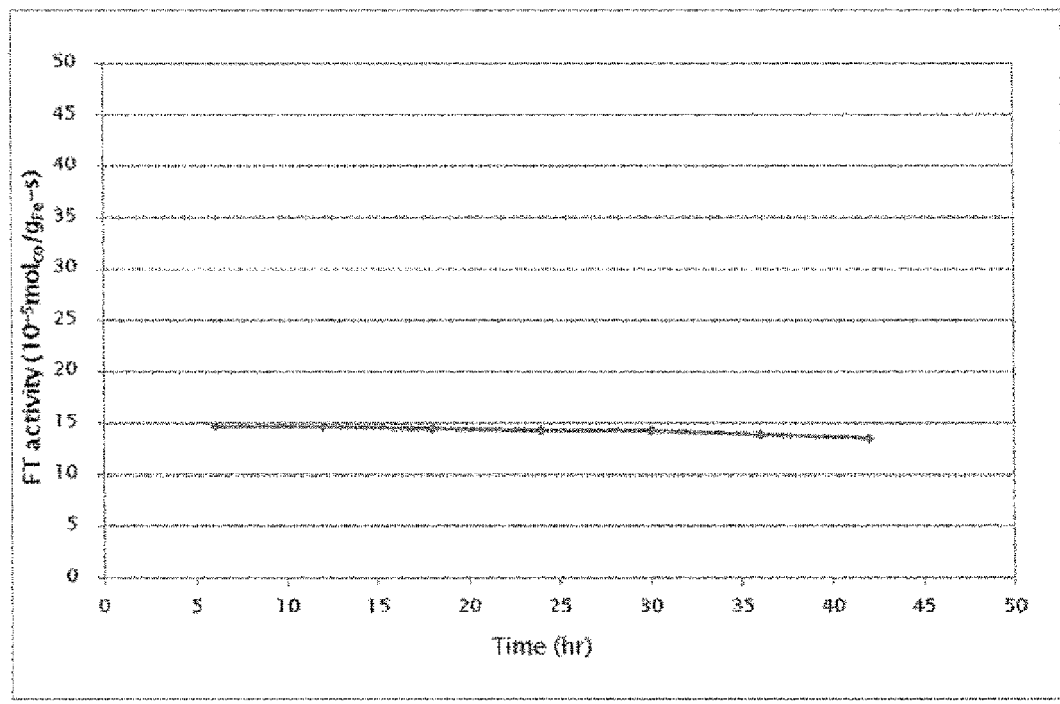
FIG. 12 is a graph showing FT activity of hydrocarbon production of an iron carbide/activated carbon catalyst relative to time according to Comparative Example 1.
Figure 13:
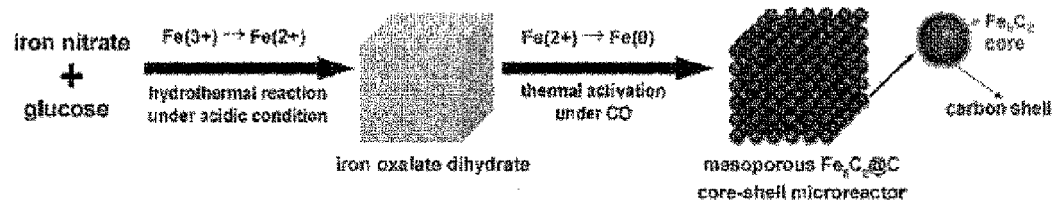
FIG. 13 shows a schematic diagram of synthetic procedures for a core-shell $Fe_5C_2$/carbon composite body according to an embodiment of the present invention.

As a result, when the high-temperature synthesis was carried out using the iron carbide/activated carbon catalyst of a conventional method, the CO conversion rate was below 30% (FIG. 10) and the liquid product selectivity for hydrocarbons having at least C$_{5+}$ was also as significantly low as 33% (FIG. 11). Also, in comparison of FTY, which indicate the activity according to units of iron, an active species in the overall loaded catalyst, in grams per hour, the iron carbide/activated carbon catalyst showed lower FTY activity than Fe$_5$C$_2$/carbon (FIG. 8), as shown in FIG. 12.

Example 5

Synthesis of Cube-Type Iron Oxalate Body Using Hydrothermal Reaction and Conversion Thereof into Highly Active Iron Carbide/Carbon Catalyst 10.1 g of Fe(NO$_3$)$_3$.9H$_2$O salt, 8.3 g (three equivalents) of polyvinylpyrrolidone (PVP, average Mw~55000), and 9 g of glucose, were placed into a flask containing 50 mL of distilled water, and the resulting mixture was stirred under an air atmosphere and heated to 100° C. After heating, the resulting mixture underwent hydrothermal reaction at 100° C. for 1 hour, and the mixture was cooled to room temperature to terminate the reaction.

A colloidal solution, which was cooled at room temperature, was dispersed and washed by pouring distilled water and ethanol thereinto, respectively, and precipitated by centrifugation at 8000 rpm for 10 minutes. The thus-precipitated iron oxalate particles were re-dispersed and washed in ethanol.

Figure 14:
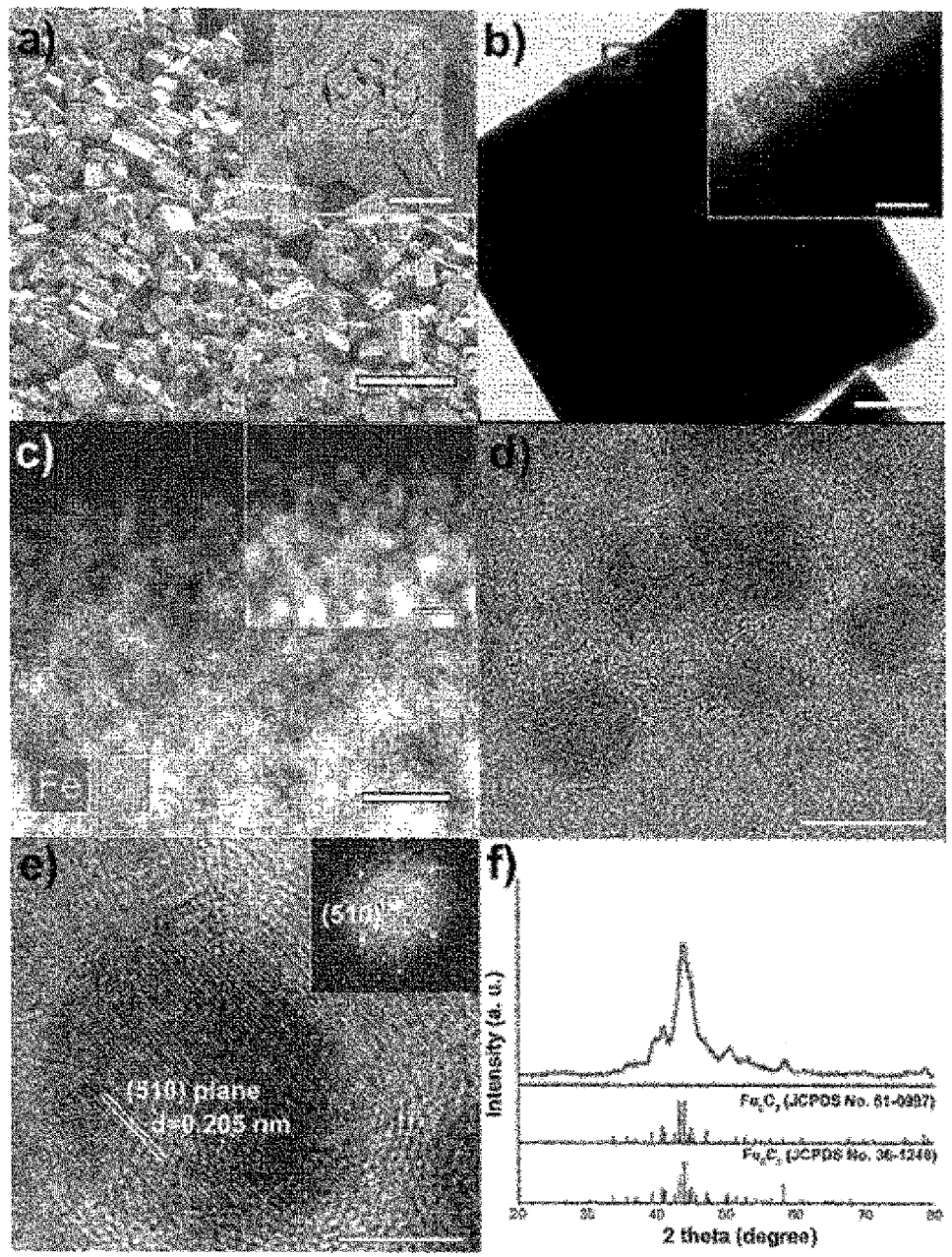
FIG. 14 shows shape analysis results of a core-shell $Fe_5C_2$/carbon composite body according to Example 5.
Figure 15:
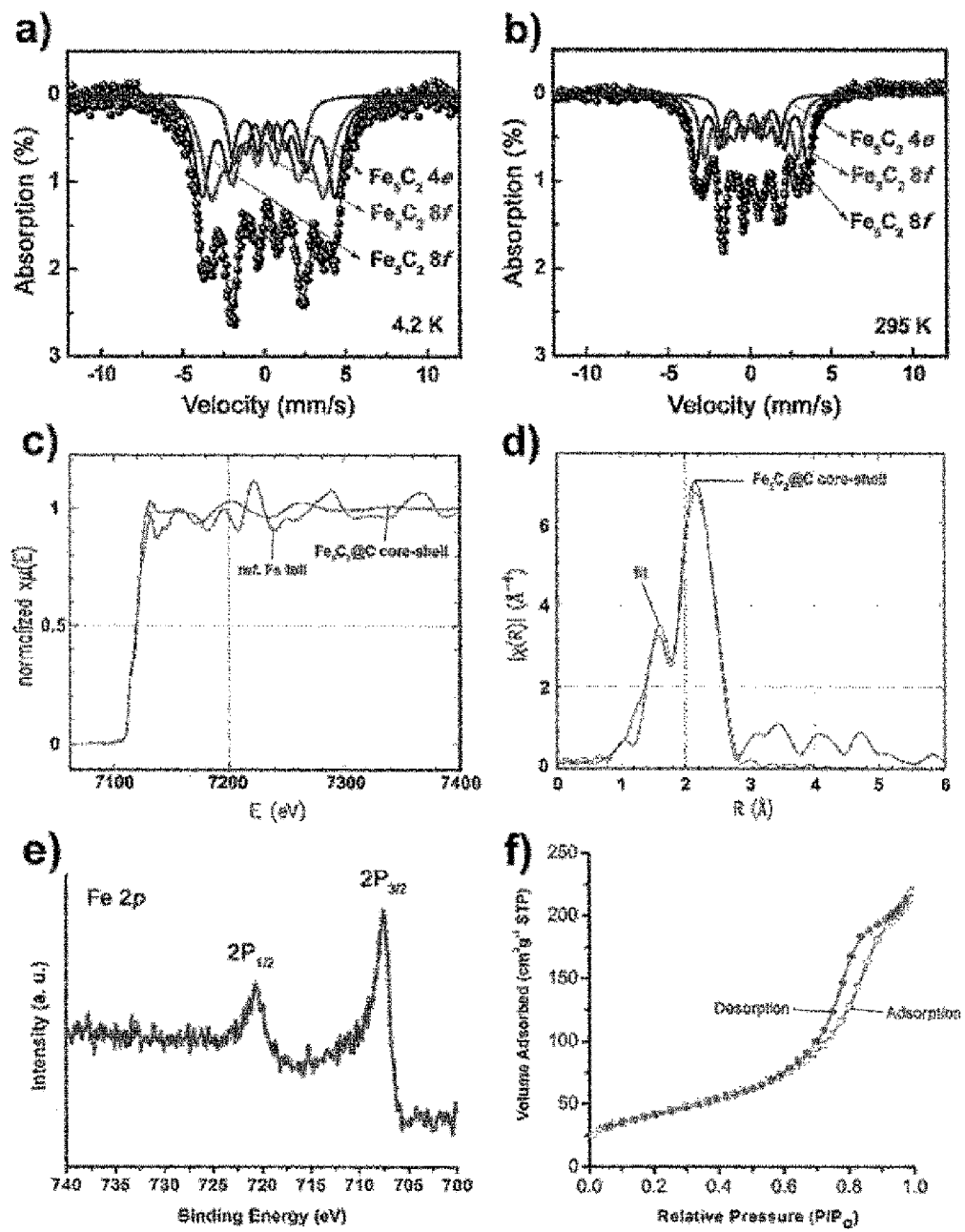
FIG. 15 shows phase analysis results of a core-shell $Fe_5C_2$/carbon composite body according to Example 5 and confirmation results of the porous structure of the same.
Figure 16:
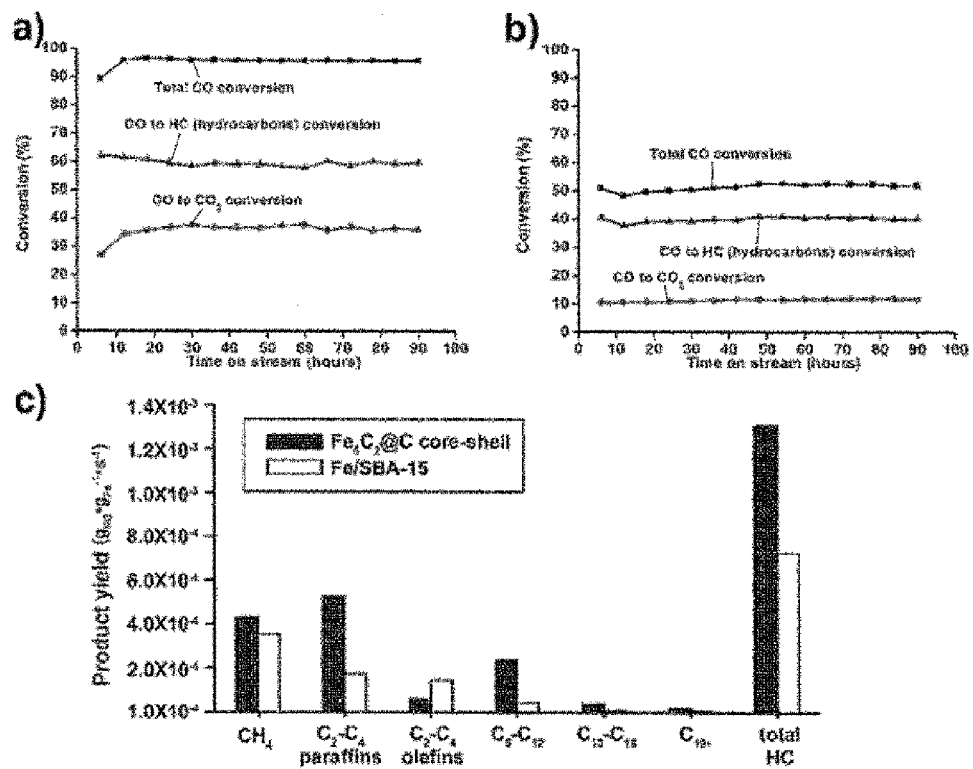
FIG. 16 shows comparative results of catalytic performance between a core-shell $Fe_5C_2$/carbon composite body according to Example 5, as a catalyst during FT synthesis, and a conventional Fe/SBA-15 catalyst.

The iron oxalate powder dried after precipitation was introduced into a tubular calcinator, and was subjected to heat treatment at 350° C. for 4 hours under a carbon monoxide gaseous atmosphere (atmospheric pressure, velocity at 200 mL/min) to obtain a Fe$_5$C$_2$/carbon nanocomposite catalyst (FIGS. 14 and 15).

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A metal carbide/carbon composite body which is formed by high-temperature calcination of a metal oxalate hydrate body having a certain shape under a carbon monoxide-containing gas atmosphere,
    wherein the metal carbide/carbon composite body has a porous structure in which core-shell unit particles are three-dimensionally connected,
    wherein the core-shell unit particles comprise a metal carbide core formed by thermal decomposition of a metal oxalate hydrate; and a graphitic carbon shell, the product resulting from Boudouard reaction of carbon monoxide, formed on the metal carbide core.

2. The metal carbide/carbon composite body of claim 1, wherein the shape of the metal carbide/carbon composite body having a porous structure resembles the shape of a metal oxalate hydrate body.

3. The metal carbide/carbon composite body of claim 1, wherein the average diameter of the metal carbide/carbon composite body having a porous structure is from 1 μm to 100 μm.

4. The metal carbide/carbon composite body of claim 1, wherein the average diameter of the core-shell unit particles is from 1 nm to 100 nm.

5. The metal carbide/carbon composite body of claim 1, wherein a core-shell unit particle serves as one microreactor.

6. The metal carbide/carbon composite body of claim 1, wherein the metal oxalate hydrate body is an iron oxalate hydrate body, and a metal carbide formed therefrom is iron carbide.

7. A method for preparing the metal carbide/carbon composite body having a porous structure according to claim 1, wherein the method comprises:
    calcining a metal oxalate hydrate body having a certain shape at high temperature under a carbon monoxide-containing gas atmosphere (step 1).

8. The method of claim 7, wherein the method comprises the following steps prior to step 1:
    preparing a mixture comprising a metal hydrate salt, a surfactant, a saccharide, and water (step 1-1);
    heating the mixture of step 1-1 to decompose the metal hydrate salt via hydrothermal reaction, thereby forming a metal oxalate hydrate body having a controlled shape (step 1-2); and optionally cooling the product obtained in step 1-2 and washing the metal oxalate hydrate body (step 1-3).

9. The method of claim 8, wherein the shape of the metal oxalate hydrate body is controlled by regulating the type of saccharide, the type of surfactant, the amount of saccharide added, and/or the amount of surfactant added.

10. The method of claim 9, wherein the shape of the metal oxalate hydrate body is controlled to have the shape of a rectangular cuboid or a cube.

11. The method of claim 8, wherein the hydrothermal reaction is carried out by heating the mixture of step 1-1 to a temperature of 80° C. to 150° C., followed by reacting the mixture for 30 minutes to 48 hours.

12. The method of claim 8, wherein the metal hydrate salt is at least one selected from iron(III) chloride tetrahydrate, iron(II) chloride tetrahydrate, iron(III) chloride hexahydrate, iron(II) chloride tetrahydrate, iron(III) nitrate nonahydrate, iron(III) sulfate hydrate, iron(II) perchlorate hydrate, and iron(II) sulfate hydrate.

13. The method of claim 8, wherein the saccharide is at least one selected from a monosaccharide, a disaccharide, and a polysaccharide.

14. The method of claim 13, wherein the monosaccharide is at least one selected from glucose, fructose, and galactose, the disaccharide is at least one selected from sucrose, lactose, maltose, trehalose, melibiose, and cellobiose, and the polysaccharide is at least one selected from raffinose, stachyose, starch, dextrin, glycogen, and cellulose.

15. The method of claim 8, wherein the surfactant is polyvinylpyrrolidone (PVP), a polymer surfactant, and the PVP having an average molecular weight of 10,000 to 36,000 is used.

16. The method of claim 7, wherein the high-temperature calcination is carried out at a heat treatment temperature of 300° C. to 450° C.

17. The metal carbide/carbon composite body of claim 1, wherein the metal carbide/carbon composite body is used as catalysts, adsorbents, electrode materials, or sensor materials.

18. A method for preparing liquid or solid hydrocarbons from syngas via the Fischer-Tropsch synthesis, wherein the method comprises:

applying the composite body of claim 1 as a catalyst in a Fischer-Tropsch synthesis reactor (step a); and carrying out the Fischer-Tropsch synthesis in the presence of the catalyst by introducing syngas into the reactor (step b).

19. The method of claim 18, wherein the composite body catalyst has a porous structure in which iron carbide/carbon unit particles in the shape of a core-shell are connected together, wherein the core-shell unit particles comprise an iron carbide core of a Hägg carbide ($\chi$-$Fe_5C_2$) species and a graphitic carbon shell.

\* \* \* \* \*